United States Patent
Yang

(10) Patent No.: US 11,167,590 B2
(45) Date of Patent: Nov. 9, 2021

(54) CASTER

(71) Applicant: Teng-Chiang Yang, Taichung (TW)

(72) Inventor: Teng-Chiang Yang, Taichung (TW)

( * ) Notice: Subject to any disclaimer, the term of this patent is extended or adjusted under 35 U.S.C. 154(b) by 0 days.

(21) Appl. No.: 16/677,556

(22) Filed: Nov. 7, 2019

(65) Prior Publication Data
US 2020/0207148 A1 Jul. 2, 2020

(30) Foreign Application Priority Data
Dec. 28, 2018 (TW) ................. 107147796

(51) Int. Cl.
*B60B 33/00* (2006.01)
*B60B 33/04* (2006.01)

(52) U.S. Cl.
CPC ...... *B60B 33/0015* (2013.01); *B60B 33/0049* (2013.01); *B60B 33/0057* (2013.01); *B60B 33/0068* (2013.01); *B60B 33/045* (2013.01); *B60B 33/001* (2013.01); *B60B 33/0042* (2013.01)

(58) Field of Classification Search
CPC ............ B60B 33/0015; B60B 33/0049; B60B 33/0057; B60B 33/0068; B60B 33/045; B60B 33/001; B60B 33/0042; B60B 33/0073; B60B 33/0021
See application file for complete search history.

(56) References Cited

U.S. PATENT DOCUMENTS

| | | | | |
|---|---|---|---|---|
| 6,834,746 | B1 * | 12/2004 | Lin | B60B 33/0018 16/35 R |
| 7,207,084 | B2 * | 4/2007 | Melara | B60B 33/001 16/22 |
| 9,387,723 | B2 * | 7/2016 | Beatty | B60B 33/0086 |
| 2004/0068831 | A1 * | 4/2004 | Caruso | B60B 33/0021 16/18 R |
| 2011/0225769 | A1 * | 9/2011 | Tsai | B60B 33/0021 16/31 A |

FOREIGN PATENT DOCUMENTS

| | | | |
|---|---|---|---|
| DE | 202019100668 U1 * | 2/2019 | |
| EP | 1253023 A1 * | 10/2002 | |
| EP | 2105323 A1 * | 9/2009 | |
| WO | WO-2015200258 A1 * | 12/2015 | |

* cited by examiner

*Primary Examiner* — Victor D Batson
*Assistant Examiner* — Matthew J Sullivan
(74) *Attorney, Agent, or Firm* — Che-Yang Chen; Law Office of Michael Chen

(57) ABSTRACT

A caster may include a shaft, a first elastic ring, a C-shaped ring, and a second elastic ring. The shaft has one end inserted and secured in a wheel, and a first rod is extended from the other end of the shaft, and a second rod protrudes from an end of the first rod. The diameter of the first rod is larger than that of the second rod, and an end of the second rod comprises a flexible portion. The shaft only needs to be processed to form the second rod and the flexible portion, and the first elastic ring and the second elastic ring which are identical are adapted to be formed through the same mold so as to save the manufacturing cost.

8 Claims, 10 Drawing Sheets

CASTER

FIELD OF THE INVENTION

The present invention relates to a caster and more particularly to a caster pivot structure with double elastic rings for connection between a caster and a chair leg.

BACKGROUND OF THE INVENTION

Referring to FIG. 10, a conventional caster comprises a shaft (60), a C-shaped ring (61), and a plastic retaining ring (62). The shaft (60) has an upper groove (63) and a lower groove (64), and an inner surface of the retaining ring (62) has a peripheral protruding edge (621) at a position corresponding to the upper groove (63). The retaining ring (62) is disposed on an outer periphery of a top portion of the shaft (60), and the protruding edge (621) is coupled in the upper groove (63). Moreover, the C-shaped ring (61) is coupled in the lower groove (64) of the shaft (60), and the shaft (60) is connected to a chair leg which is made of metal such as aluminum alloy. The retaining ring (62) is adapted to couple in and abut against a connecting hole (70) of the chair leg so as to prevent noise making from the metal collision between the shaft (60) and the connecting hole (70).

However, the conventional caster has following disadvantages: (i) the shaft (60) is processed to form the upper groove (63) and the lower groove (64) to respectively couple with the C-shaped ring (61) and the retaining ring (62), and also specific tools are required to assemble the C-shaped ring (61) on the lower groove (64), which is difficult for assembly and high production cost; (ii) since the C-shaped ring (61) is directly disposed on the lower groove (64), the lower groove (64) has to be processed into a deeper groove to accommodate the C-shaped ring (61), which also increases the manufacturing cost; and (iii) the friction and collision between the C-shaped ring (61) and the lower groove (64) which are made of metal are configured to make noise when the caster is used. Therefore, there remains a need for a new and improved design for a caster to overcome the problems presented above.

SUMMARY OF THE INVENTION

The present invention provides a caster which comprises a shaft, a first elastic ring, a C-shaped ring, and a second elastic ring. The shaft has one end inserted and secured in a wheel, and a first rod is extended from the other end of the shaft, and a second rod protrudes from an end of the first rod. The diameter of the first rod is larger than that of the second rod, and an end of the second rod comprises a flexible portion. The first elastic ring has a first outer periphery and a central hole, and the first elastic ring is disposed on the second rod of the shaft through the central hole so as to align the first outer periphery with an outer periphery of the first rod. An open end of the central hole has a first collar axially extended from an edge thereof, and the radial distance between a center of the central hole and the first outer periphery is two to four times greater than the radial distance between the center of the central hole and the first collar, and the first collar is positioned at a middle portion of the second rod. The C-shaped ring disposed on the second rod through the flexible portion is disposed on the first collar of the first elastic ring, and the outer diameter of the C-shaped ring is larger than the diameter of the first rod. The second elastic ring has a second outer periphery and an axle hole, and the second elastic ring is disposed on the second rod of the shaft through the axle hole, and the second outer periphery is aligned with the outer periphery of the first rod. A second collar is axially extended from an edge of an open end of the axle hole, and the diameter of the second collar and the diameter of the first collar are the same so as to connect together to prevent the C-shaped ring from coupling with the shaft. The flexible portion of the shaft is adapted to expand after the first elastic ring, the C-shaped ring, and the second elastic ring are disposed thereon so as to secure the positions of the first elastic ring, the C-shaped ring, and the second elastic ring on the second rod of the shaft.

In one embodiment, an open end of the first collar and an open end of the second collar respectively have a first wavy edge and a second wavy edge which are adapted to fit together.

In another embodiment, an open end of the first collar and an open end of the second collar respectively have a first zigzag edge and a second zigzag edge which are adapted to fit together.

In still another embodiment, each of the axial height of the first collar and the axial height of the second collar is the same as the axial height of the C-shaped ring.

In a further embodiment, each of the first elastic ring and the second elastic ring is made of nylon integrally, and the shaft and the C-shaped ring are made of metal.

In still a further embodiment, a tapered ring is formed on an outer surface of the shaft between the wheel and the first rod, and the diameter of the tapered ring is gradually smaller toward the first rod.

In an advantageous embodiment, an open end of the second elastic ring other than the end having the second collar comprises a second annular recess portion at an inner periphery thereof, and the second annular recess portion is adapted to provide deformation space for the flexible portion.

In a preferred embodiment, an open end of the first elastic ring other than the end comprising the first collar has a first annular recess portion at an inner periphery thereof, and the first annular recess portion is adapted to reduce the thickness of the first elastic ring, so as to enhance the elasticity of the first elastic ring against the first rod.

In a particular embodiment, the first elastic ring and the second elastic ring have the same structure which is formed by the same mold.

Comparing with conventional caster, the present invention is advantageous because: (i) the shaft only needs to be processed to form the second rod and the flexible portion, and the first elastic ring and the second elastic ring can be formed through the same mold so as to save the manufacturing cost; (ii) the second collar is adapted to fit together with the first collar, and the first elastic ring, the C-shaped ring, the second elastic ring are sequentially disposed on the second rod of the shaft, so as to prevent noise making from the metal collision between the C-shaped ring and the shaft and lower the manufacturing cost and the difficulty of assembly; (iii) the elasticity of the first elastic ring and the second elastic ring are adapted to move the shaft back to its initial position after swinging relative to the connecting hole, and the first elastic ring and the second elastic ring are configured to secure the position of the C-shaped ring while the first collar and the second collar are adapted to prevent the C-shaped ring to couple with the shaft, so as to achieve anti-noise effect when the wheel is used; and (iv) the first elastic ring and the second elastic ring are engaged together through the first wavy edge and the second wavy edge or through the first zigzag edge and the second zigzag edge, and the C-shaped ring is coupled between the first elastic ring and the second elastic ring, so as to reduce friction between each two adjacent components and increase the structural strength.

DETAILED DESCRIPTION OF THE INVENTION

Figure 1:
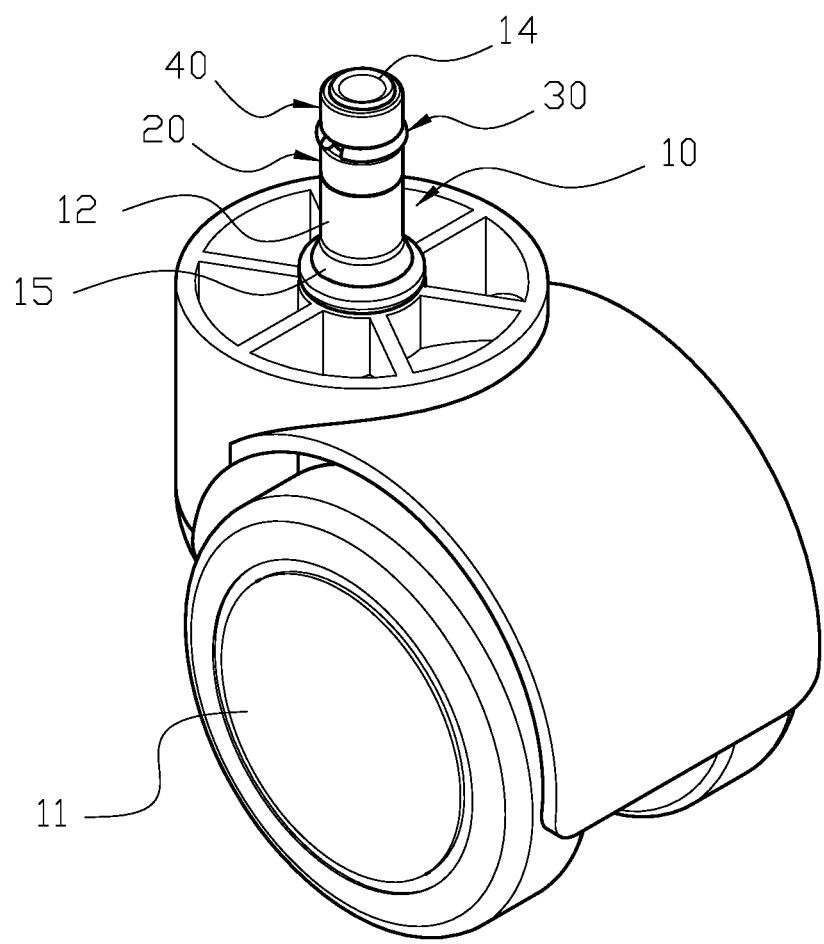
FIG. 1 is a three-dimensional assembly view of a caster of the present invention.

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

In order to further understand the goal, characteristics and effect of the present invention, a number of embodiments along with the drawings are illustrated as following:

Referring to FIGS. 1 to 4, the present invention provides a caster which comprises a shaft (10), a first elastic ring (20), a C-shaped ring (30), and a second elastic ring (40). The shaft (10) has one end inserted and secured in a wheel (11), and a first rod (12) is extended from the other end of the shaft (10), and a second rod (13) protrudes from an end of the first rod (12). The diameter of the first rod (12) is larger than that of the second rod (13), and an end of the second rod (13) comprises a flexible portion (14). Moreover, a tapered ring (15) is formed on an outer surface of the shaft (10) between the wheel (11) and the first rod (12), and the diameter of the tapered ring (15) is gradually smaller toward the first rod (12). The first elastic ring (20) has a first outer periphery (21) and a central hole (22), and the first elastic ring (20) is disposed on the second rod (13) of the shaft (10) through the central hole (22) so as to align the first outer periphery (21) with an outer periphery of the first rod (12). Furthermore, an open end of the central hole (22) has a first collar (23) axially extended from an edge thereof, and the radial distance between a center of the central hole (22) and the first outer periphery (21) is two to four times greater than the radial distance between the center of the central hole (22) and the first collar (23), and the first collar (23) is positioned at a middle portion of the second rod (13). The C-shaped ring (30) disposed on the second rod (13) through the flexible portion (14) is disposed on the first collar (23) of the first elastic ring (20), and the outer diameter of the C-shaped ring (30) is larger than the diameter of the first rod (12). The second elastic ring (40) has a second outer periphery (41) and an axle hole (42), and the second elastic ring (40) is disposed on the second rod (13) of the shaft (10) through the axle hole (42), and the second outer periphery (41) is aligned with the outer periphery of the first rod (12). A second collar (43) is axially extended from an edge of an open end of the axle hole (42), and the diameter of the second collar (43) and the diameter of the first collar (23) are the same so as to connect together to prevent the C-shaped ring (30) from coupling with the shaft (10). Moreover, the flexible portion (14) of the shaft (10) is adapted to expand after the first elastic ring (20), the C-shaped ring (30), and the second elastic ring (40) are disposed thereon so as to secure the positions of the first elastic ring (20), the C-shaped ring (30), and the second elastic ring (40) on the second rod (13) of the shaft (10).

Structurally, referring to FIGS. 1 to 4, the first elastic ring (20) is disposed on the second rod (13) through the central hole (22), and one end of the first elastic ring (20) is abutted against the first rod (12), and the first collar (23) on the other end of the first elastic ring (20) is faced to the flexible portion (14). Also, the C-shaped ring (30) is disposed on the second rod (13) from the end having the flexible portion (14), and the C-shaped ring (30) is disposed on the first collar (23) of the first elastic ring (20). Furthermore, the second elastic ring (40) is disposed on the second rod (13) of the shaft (10) through the axle hole (42), and the second collar (43) is connected to the first collar (23) of the first elastic ring (20). The C-shaped ring (30) is coupled between the first elastic ring (20) and the second elastic ring (40), and the first collar (23) and the second collar (43) are connected to prevent the connection between the C-shaped ring (30) and the shaft (10). The flexible portion (14) is adapted to expand outwardly after the first elastic ring (20), the C-shaped ring (30), and the second elastic ring (40) are disposed on the second rod (13) of the shaft (10) so as to secure the positions of the first elastic ring (20), the C-shaped ring (30), and the second elastic ring (40). The shaft (10) only needs to be processed to form the second rod (13) and the flexible portion (14), and the first elastic ring (20) and the second elastic ring (30) can be formed through the same mold so as to save the manufacturing cost. In addition, the second collar (43) of the second elastic ring (40) is faced to the first collar (23), and the first elastic ring (20), the C-shaped ring (30), the second elastic ring (40) are sequentially disposed on the second rod (13) of the shaft (10), so as to prevent noise making from the metal collision between the C-shaped ring (30) and the shaft (10) and lower the manufacturing cost and the difficulty of assembly.

In actual application, referring to FIGS. 1 to 7, one end of the shaft (10) is inserted and secured in the wheel (11) while the other end thereof is inserted into the connecting hole (51) of the chair leg (50), and the first outer periphery (21) of the first elastic ring (20) and the second outer periphery (41) of the second elastic ring (40) are abutted against an inner wall of the connecting hole (51). Moreover, the C-shaped ring (30) is also abutted against the inner wall of the connecting hole (51) so as to prevent the shaft (10) from detached from the chair leg (50). Meanwhile, the chair leg (50) is pressed the tapered ring (15) downwardly to secure the connection between the shaft (10) and the chair leg (50). The elasticity of the first elastic ring (20) and the second elastic ring (40) are adapted to move the shaft (10) back to its initial position after swinging relative to the connecting hole (51). Moreover, the first elastic ring (20) and the second elastic ring (40) are configured to secure the position of the C-shaped ring (30), and the first collar (23) and the second collar (43) are adapted to prevent the C-shaped ring (30) to couple with the shaft (10) so as to achieve anti-noise effect when the wheel (11) is used.

Figure 2:
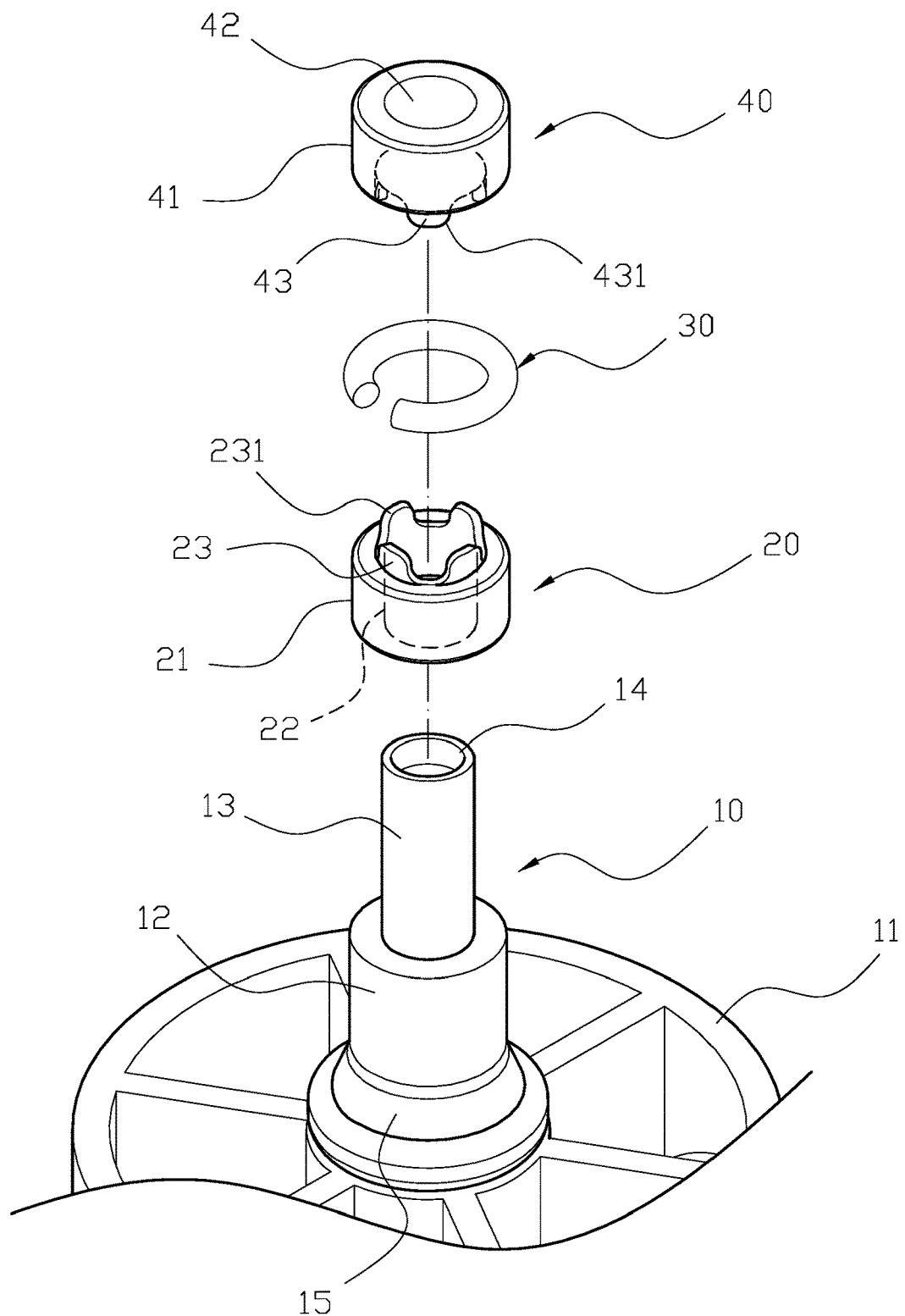
FIG. 2 is a three-dimensional exploded view of the caster of the present invention.
Figure 3:
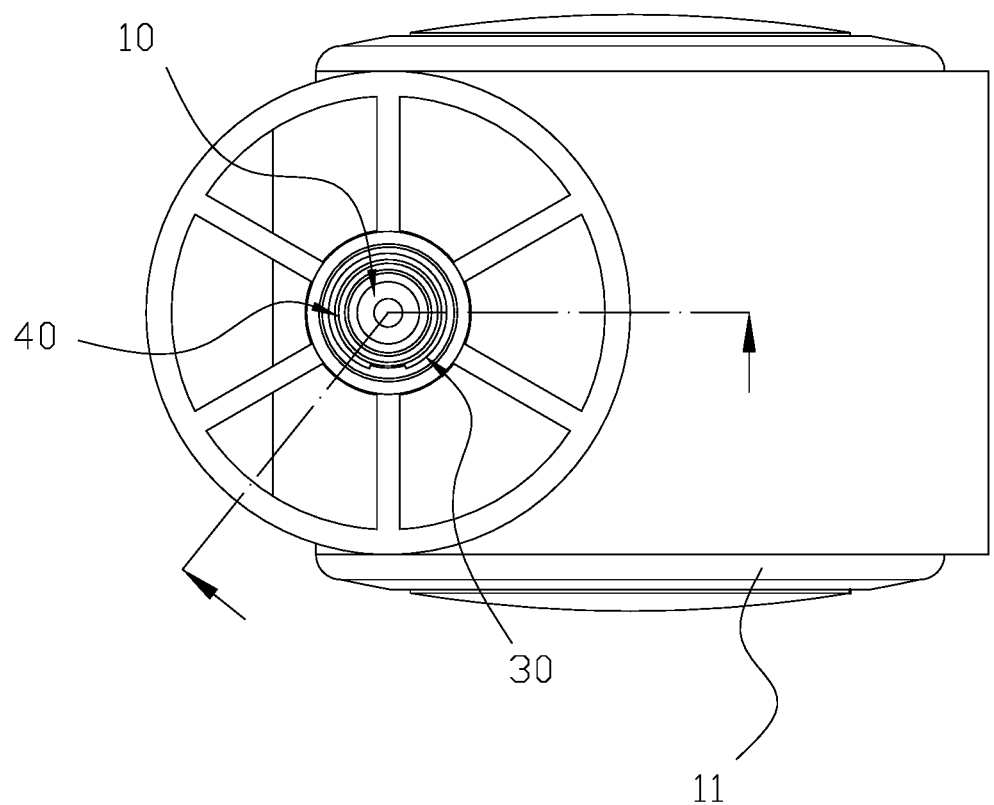
FIG. 3 is a top view of the caster of the present invention.
Figure 4:
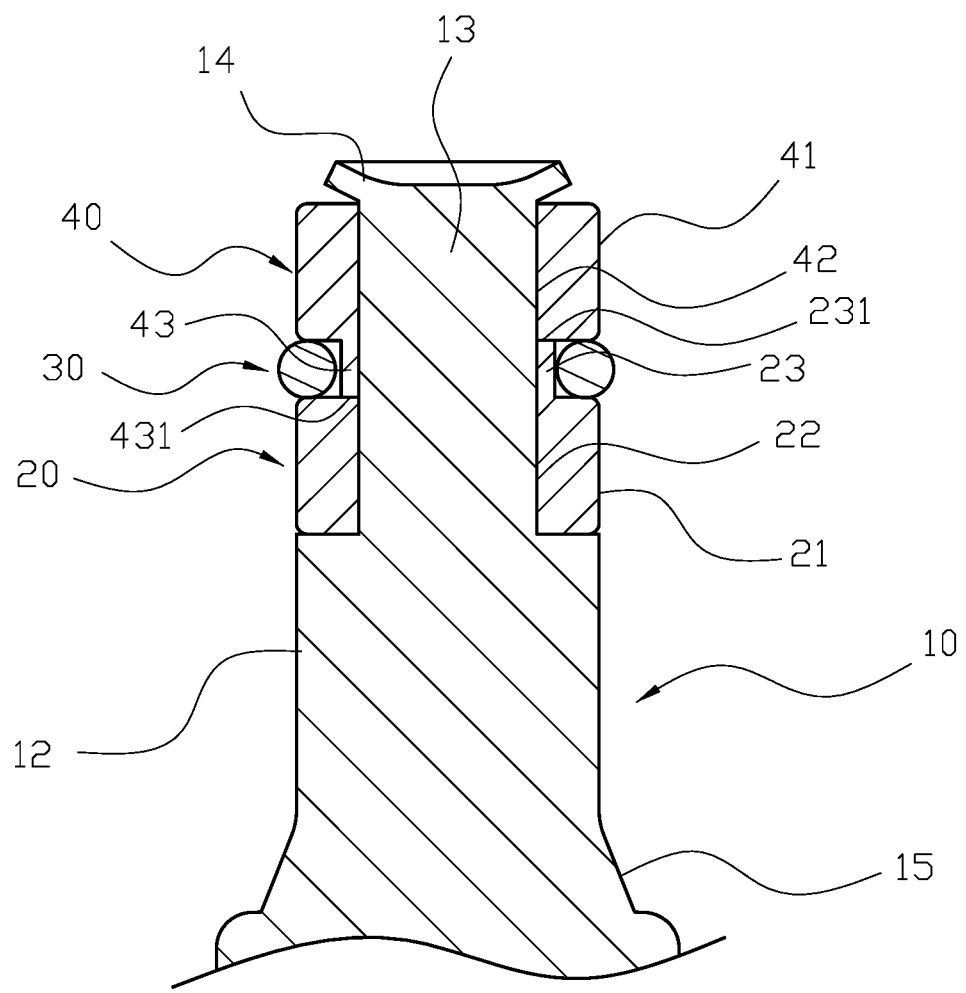
FIG. 4 is a sectional view of FIG. 3 along the broken line in FIG. 3.
Figure 5:
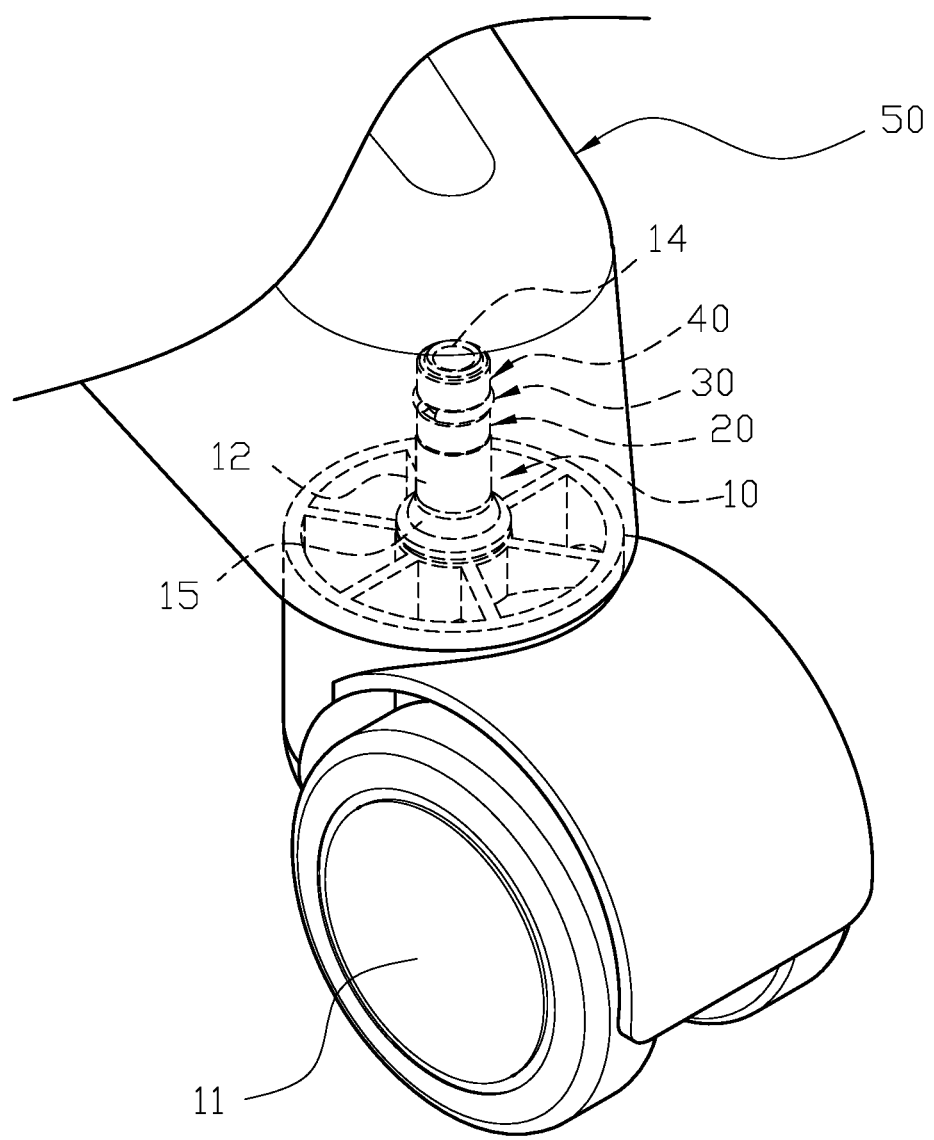
FIG. 5 is a schematic view of the caster of the present invention when the caster is in use.
Figure 6:
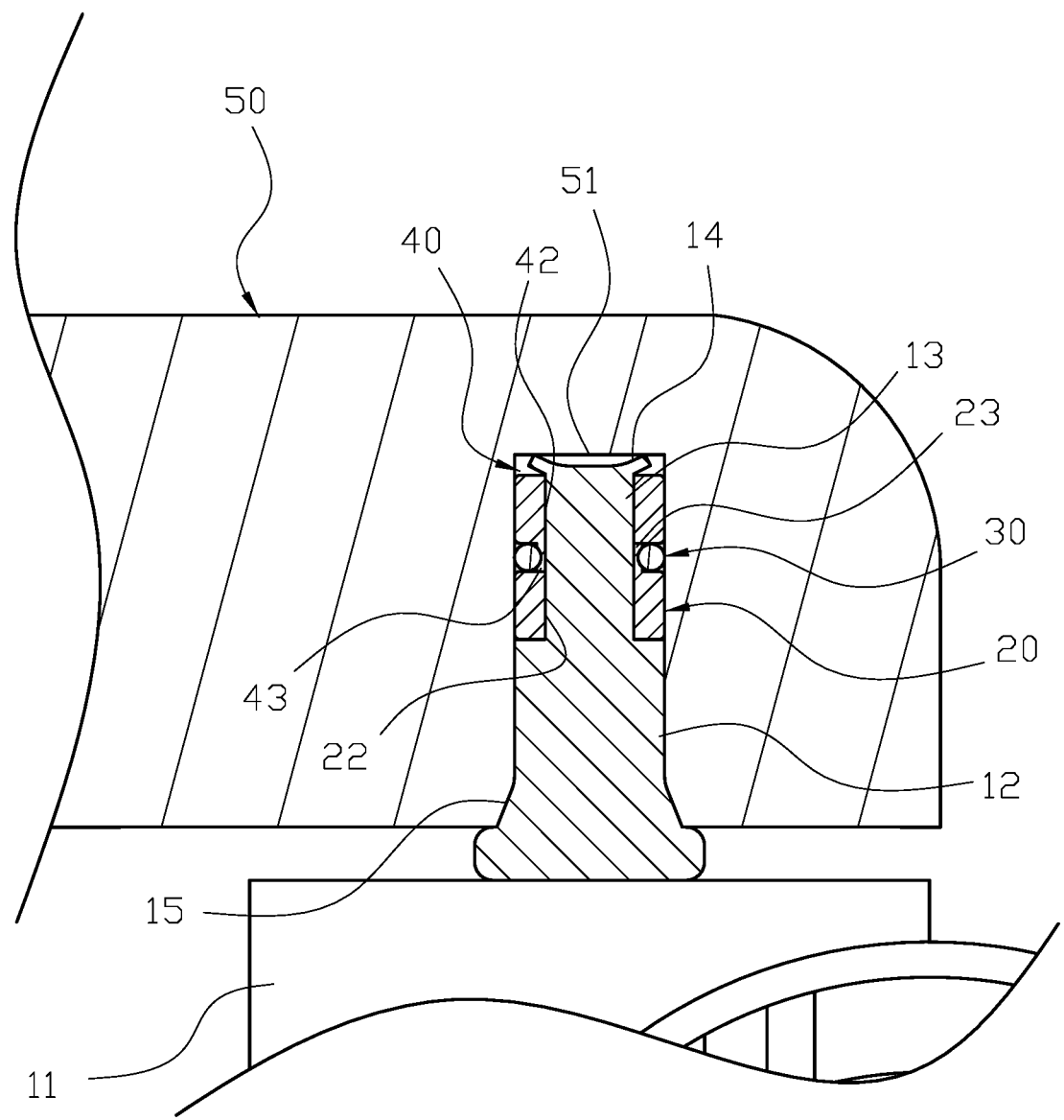
FIG. 6 is a sectional view of the caster of the present invention when the caster is in use.
Figure 7:
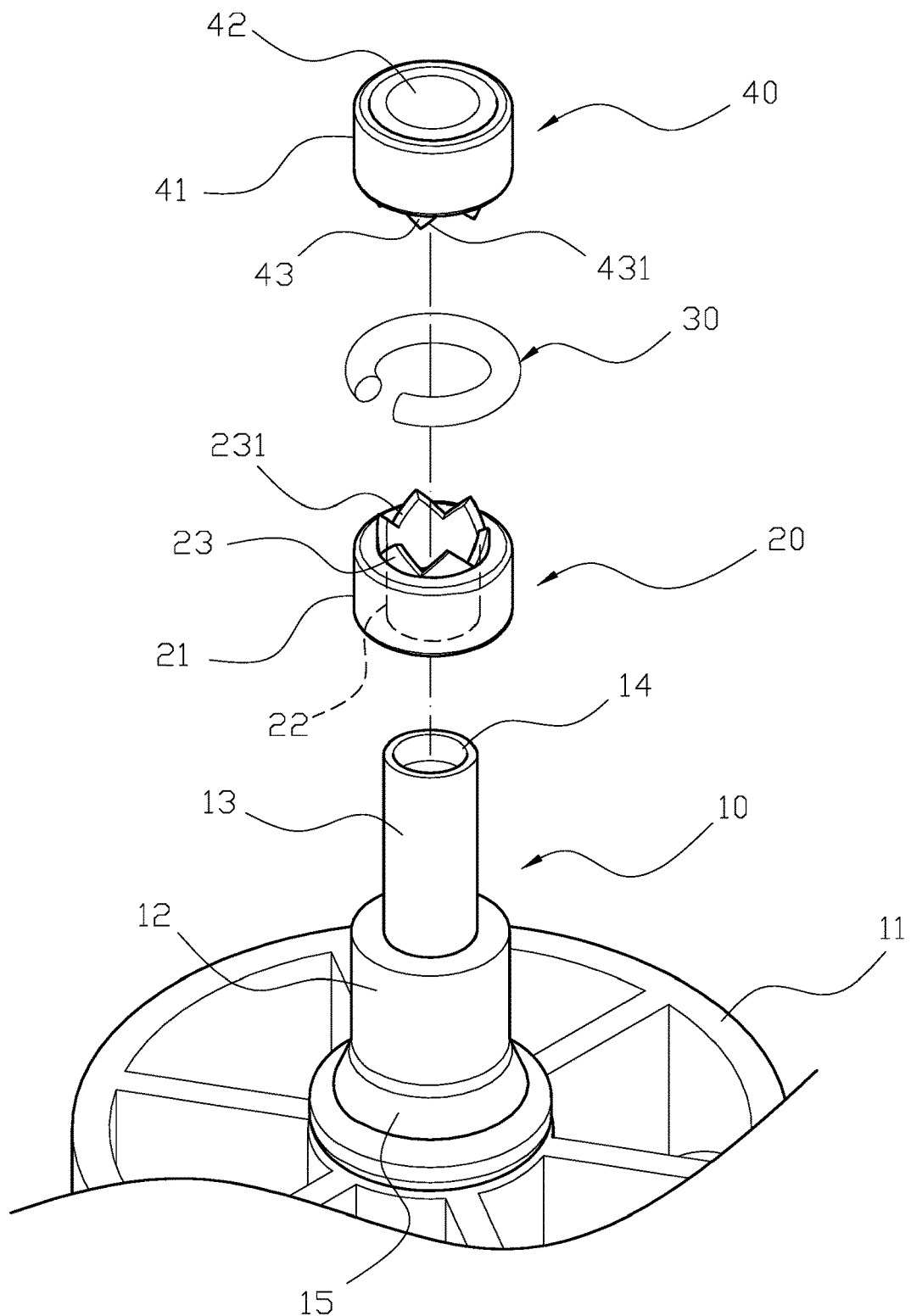
FIG. 7 is another three-dimensional exploded view of the caster of the present invention.

More specifically, referring to FIG. 2, each of the first elastic ring (20) and the second elastic ring (40) is made of nylon integrally, and the shaft (10) and the C-shaped ring (30) are made of metal. Also, an open end of the first collar (23) and an open end of the second collar (43) respectively have a first wavy edge (231) and a second wavy edge (431) which are adapted to fit together, or the open end of the first collar (23) and the open end of the second collar (43) respectively have a first zigzag edge (232) and a second zigzag edge (432) which are configured to fit together (as shown in FIG. 7), such that the first elastic ring (20) and the second elastic ring (40) are engaged together through the first wavy edge (231) and the second wavy edge (431) or through the first zigzag edge (232) and the second zigzag edge (432) (as shown in FIG. 2). In addition, the C-shaped ring (30) is coupled between the first elastic ring (20) and the second elastic ring (40) so as to reduce friction between each two adjacent components and increase the structural strength. Each of the axial height of the first collar (23) and the axial height of the second collar (43) is the same as the axial height of the C-shaped ring (30), and each of the thickness of the first elastic ring (20) and the thickness of the second elastic ring (40) is greater two to four times than the thickness of the first collar (23) or the thickness of the second collar (43), so as to increase structural strengths of the first collar (23) and the second collar (43) under limited volume. Furthermore, each of the first collar (23) and the second collar (43) has the wavy edge (231)(431) or the zigzag edge (232)(432) to enable the first elastic ring (20) and the second elastic ring (40) to be engaged together such that the second collar (43) can slidably rotate along the first collar (23) to an appropriate angle so as to automatically adjust to the position where the first collar (23) and the second collar (43) are engaged, which makes the caster easy to assembly.

Figure 8:
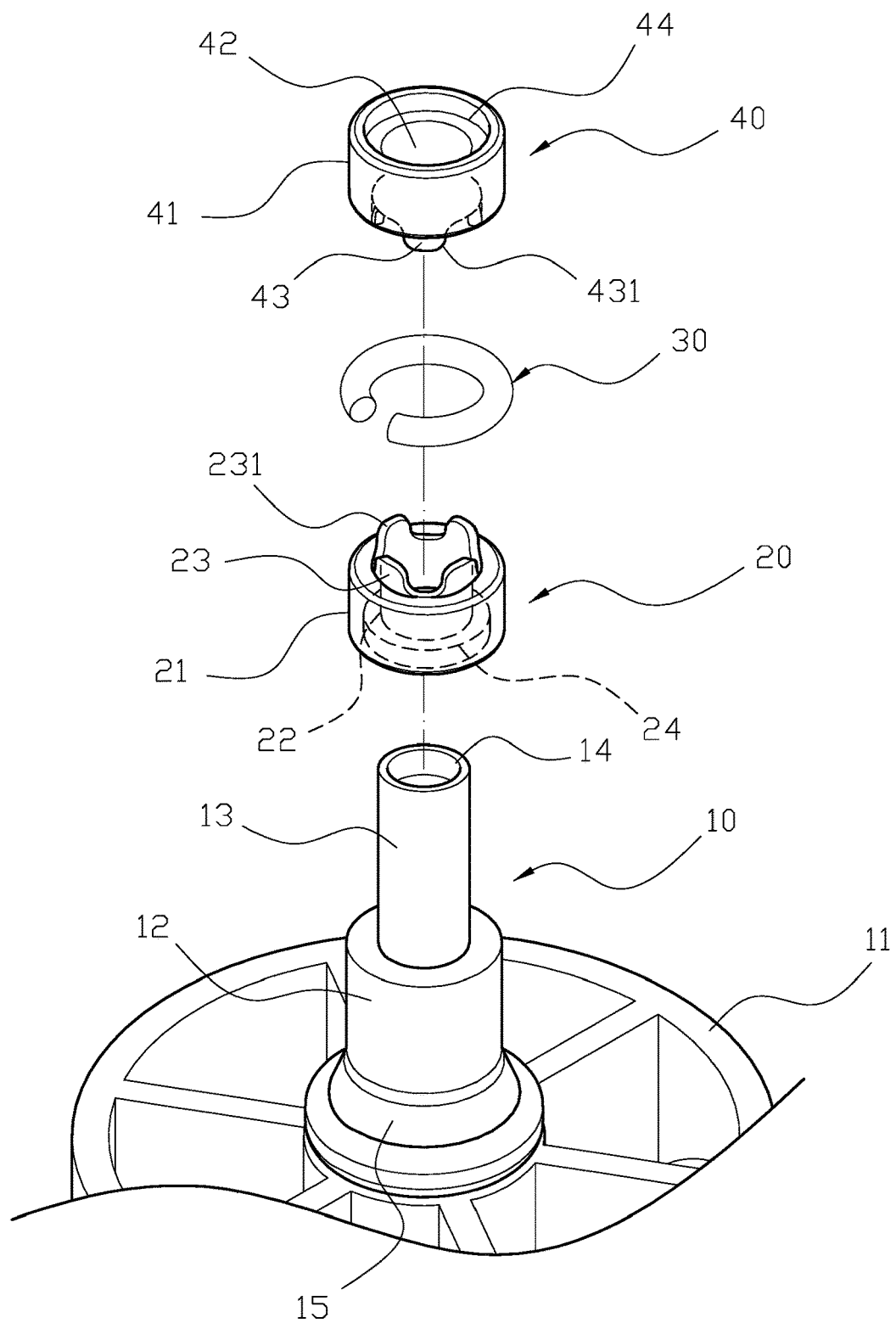
FIG. 8 is a three-dimensional exploded view of a second embodiment of the caster in the present invention.
Figure 9:
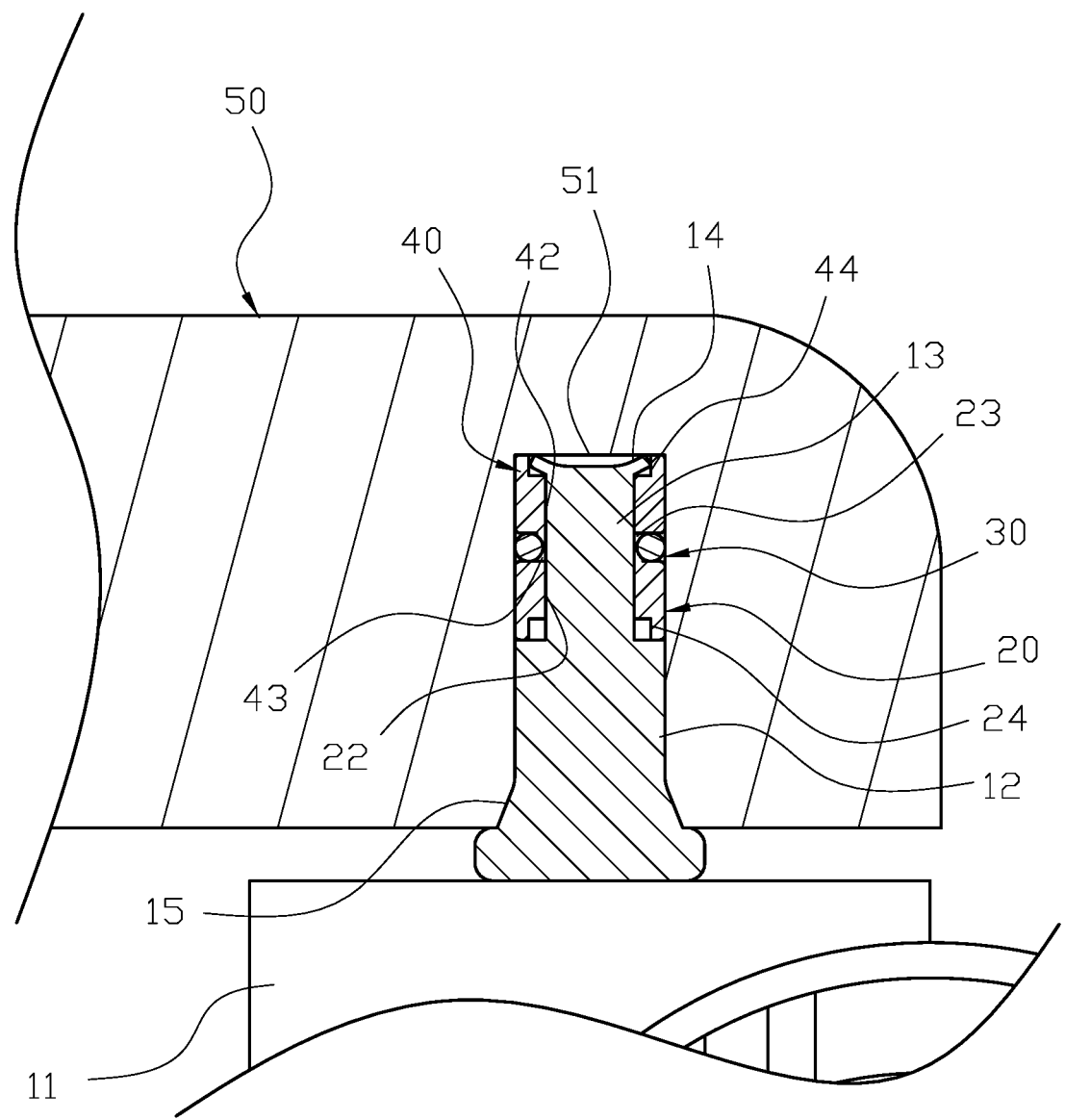
FIG. 9 is a sectional view of the second embodiment of the caster in the present invention when the caster is in use.
Figure 10:
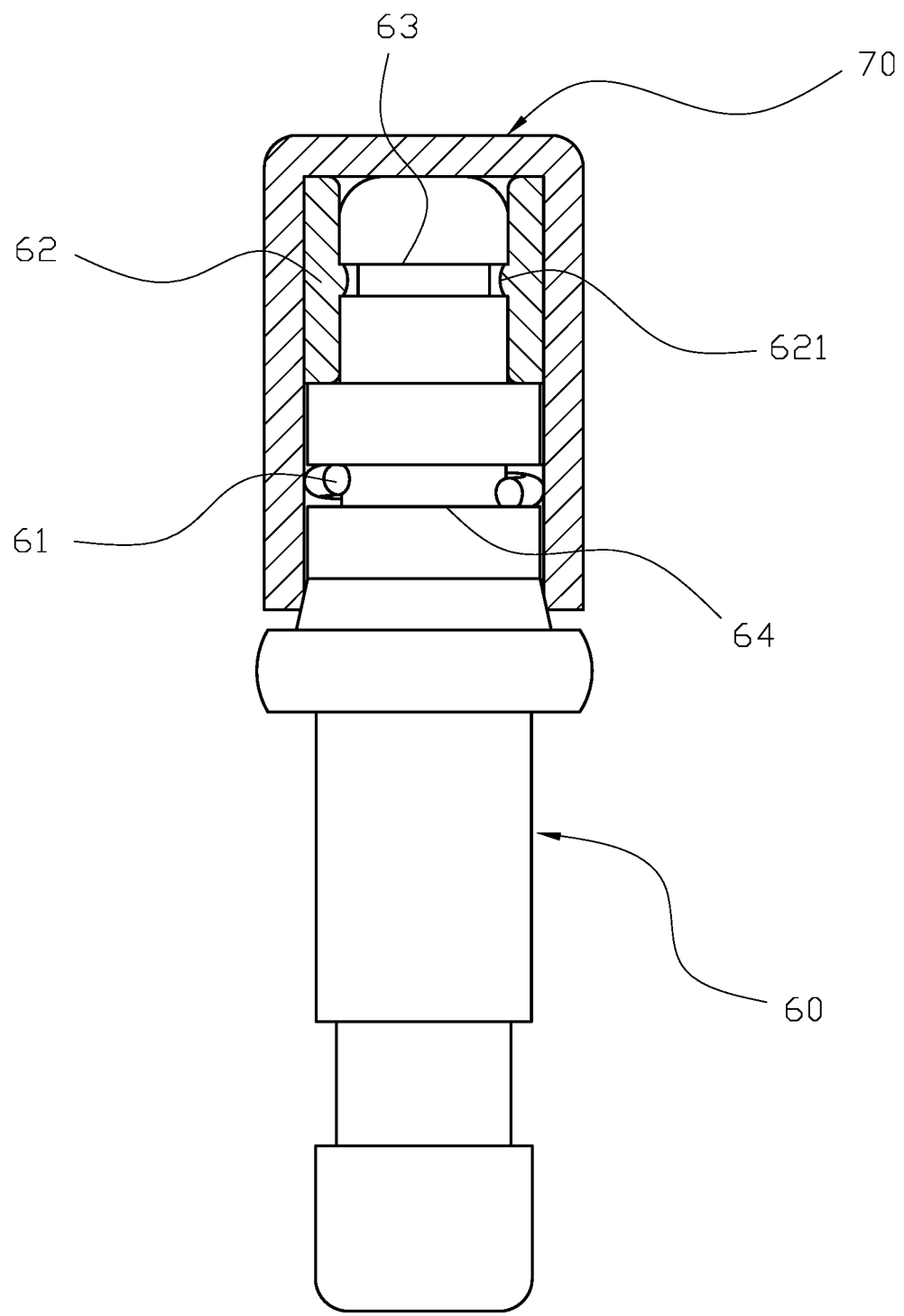
FIG. 10 is a prior art.

In another embodiment, referring to FIGS. 8 and 9, an open end of the second elastic ring (40) other than the end having the second collar (43) comprises a second annular recess portion (44) at an inner periphery thereof, and the second annular recess portion (44) is adapted to provide deformation space for the flexible portion (14) and prevent the flexible portion (14) to contact with the connecting hole (51) so as to avoid the shaft (10) to wear the chair leg (50). Also, an open end of the first elastic ring (20) other than the end comprising the first collar (23) has a first annular recess portion (24) at an inner periphery thereof. Moreover, the first elastic ring (20) and the second elastic ring (40) have the same structure which is formed by the same mold, and the second annular recess portion (44) and the first annular recess portion (24) are respectively formed with the second elastic ring (40) and the first elastic ring (20) integrally, which has no need additional molding. Additionally, the first annular recess portion (24) is adapted to reduce the thickness of the first elastic ring (20), so as to enhance the elasticity of the first elastic ring (20) against the first rod (12), thereby enabling the first elastic ring (20) to have appropriate deformation in axial direction when squeezed.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A caster comprising a shaft, a first elastic ring, a C-shaped ring, and a second elastic ring;

wherein the shaft has one end inserted and secured in a wheel, and a first rod is extended from the other end of the shaft, and a second rod protrudes from an end of the first rod; the diameter of the first rod is larger than that of the second rod, and an end of the second rod comprises a flexible portion;

wherein the first elastic ring has a first outer periphery and a central hole, and the first elastic ring is disposed on the second rod of the shaft through the central hole so as to align the first outer periphery with an outer periphery of the first rod; an open end of the central hole has a first collar axially extended from an edge thereof, and the radial distance between a center of the central hole and the first outer periphery is two to four times greater than the radial distance between the center of the central hole and the first collar, and the first collar is positioned at a middle portion of the second rod;

wherein the C-shaped ring disposed on the second rod through the flexible portion is disposed on the first collar of the first elastic ring, and the outer diameter of the C-shaped ring is larger than the diameter of the first rod; and wherein the second elastic ring has a second outer periphery and an axle hole, and the second elastic ring is disposed on the second rod of the shaft through the axle hole, and the second outer periphery is aligned with the outer periphery of the first rod; a second collar is axially extended from an edge of an open end of the axle hole, and the diameter of the second collar and the diameter of the first collar are the same so as to connect together to prevent the C-shaped ring from coupling with the shaft; the flexible portion of the shaft is adapted to abut against the first elastic ring, the C-shaped ring, and the second elastic ring so as to secure the positions thereof, wherein an open end of the first collar and an open end of the second collar respectively have a first wavy edge and a second wavy edge which are adapted to fit together, and wherein each of the axial height of the first collar and the axial height of the second collar is the same as the axial height of the C-shaped ring.

2. The caster of claim 1, wherein an open end of the first collar and an open end of the second collar respectively have a first zigzag edge and a second zigzag edge which are adapted to fit together.

3. The caster of claim 2, wherein each of the axial height of the first collar and the axial height of the second collar is the same as the axial height of the C-shaped ring.

4. The caster of claim 1, wherein each of the first elastic ring and the second elastic ring is made of nylon integrally, and the shaft and the C-shaped ring are made of metal.

5. The caster of claim 1, wherein a tapered ring is formed on an outer surface of the shaft between the wheel and the first rod, and the diameter of the tapered ring is gradually smaller toward the first rod.

6. The caster of claim 1, wherein an open end of the second elastic ring other than the end having the second collar comprises a second annular recess portion at an inner periphery thereof, and the second annular recess portion is adapted to provide deformation space for the flexible portion.

7. The caster of claim 5, wherein an open end of the first elastic ring other than the end comprising the first collar has a first annular recess portion at an inner periphery thereof, and the first annular recess portion is adapted to reduce the thickness of the first elastic ring, so as to enhance the elasticity of the first elastic ring against the first rod.

8. The caster of claim 1, wherein the first elastic ring and the second elastic ring have the same structure which is formed by the same mold.

\* \* \* \* \*